United States Patent
Hallenstål et al.

(10) Patent No.: US 11,399,315 B2
(45) Date of Patent: Jul. 26, 2022

(54) EFFICIENT EPS FALLBACK IN A 5GS ARCHITECTURE

(71) Applicant: Telefonaktiebolaget LM Ericsson (publ), Stockholm (SE)

(72) Inventors: Magnus Hallenstål, Täby (SE); Ralf Keller, Würselen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 17/041,166

(22) PCT Filed: Mar. 26, 2018

(86) PCT No.: PCT/SE2018/050314
§ 371 (c)(1),
(2) Date: Sep. 24, 2020

(87) PCT Pub. No.: WO2019/190365
PCT Pub. Date: Oct. 3, 2019

(65) Prior Publication Data
US 2021/0014741 A1    Jan. 14, 2021

(51) Int. Cl.
*H04W 36/00* (2009.01)
*H04W 28/02* (2009.01)
*H04W 48/02* (2009.01)
*H04W 48/18* (2009.01)
(Continued)

(52) U.S. Cl.
CPC ... *H04W 36/0022* (2013.01); *H04W 28/0268* (2013.01); *H04W 48/02* (2013.01); *H04W 48/18* (2013.01); *H04W 52/265* (2013.01); *H04W 84/042* (2013.01)

(58) Field of Classification Search
CPC ......... H04W 28/0268; H04W 36/0022; H04W 36/14; H04W 36/00; H04W 60/00; H04W 36/0016; H04W 36/0066; H04W 36/00837; H04W 36/34; H04W 48/02; H04W 48/18; H04W 52/265; H04W 84/042
See application file for complete search history.

(56) References Cited

U.S. PATENT DOCUMENTS

2019/0191349 A1*  6/2019  Kim ..................... H04W 36/34
2020/0252849 A1*  8/2020  Tang ..................... H04W 36/00

OTHER PUBLICATIONS

International Search Report and Written Opinion issued in International Application No. PCT/SE2018/050314 dated Dec. 11, 2018 (16 pages).

(Continued)

*Primary Examiner* — Quoc Thai N Vu
(74) *Attorney, Agent, or Firm* — Rothwell, Figg, Ernst & Manbeck, P.C.

(57) ABSTRACT

A method of managing an Evolved Packet System (EPS) fallback procedure in a 5GS network. The method comprises making available to the Access Mobility Function (AMF), a configuration parameter per Public Land Mobile Network (PLMN) indicating if early or late PCRF/PCF interaction with the IMS is used. Then, upon receipt by the network of a 5GS network registration request from a UE, the home PLMN of the UE is identified as is the configuration parameter for that PLMN. The identified parameter is then used to determine for the UE whether or not EPS fallback is available to the UE, and an indication of the determination is sent to the UE.

5 Claims, 17 Drawing Sheets

---

S1. Make available to AMF, a configuration parameter per PLMN indicating if early or late PCRF/PCF interaction with the IMS is used S2. Upon receipt by the network of a 5GS network registration request from a UE, identifying the home PLMN of the UE and the configuration parameter for that PLMN S3. Using the configuration parameter to determine for the UE whether or not EPS fallback is available to the UE and sending an indication of the determination to the UE

(51) Int. Cl.
*H04W 52/26* (2009.01)
*H04W 84/04* (2009.01)

(56) References Cited

OTHER PUBLICATIONS

Huawei et al., "Support EPS fallback for voice in NR", 3GPP TSG-RAN WG2 Meeting 101, R2-1802288, Athens, Greece, Feb. 26-Mar. 3, 2018 (3 pages).
Ericsson et al., "EPS Fallback for voice", 3GPP TSG-SA Meeting #126, S2-181637, Montreal, Canada, Feb. 26-Mar. 2, 2018 (10 pages).
Intel, "EPS Fallback for voice", SA WG2 Meeting #125, S2-180236, Jan. 22-26, 2018, Gothenburg, Sweden (3 pages).
3GPP TS 23.502 V15.1.0 (Mar. 2018), 3rd Generation Partnership Project; Technical Specification Group Services and System Aspects; Procedures for the 5G System; Stage 2 (Release 15), Mar. 2018 (285 pages).

\* cited by examiner

EFFICIENT EPS FALLBACK IN A 5GS ARCHITECTURE

CROSS REFERENCE TO RELATED APPLICATION(S)

This application is a 35 U.S.C. § 371 National Stage of International Patent Application No. PCT/SE2018/050314, filed Mar. 26, 2018, designating the United States.

TECHNICAL FIELD

The present invention relates to the provision of an efficient Evolved Packet System (EPS) fallback procedure in a 5GS architecture.

BACKGROUND

When transitioning from third generation (3G UMTS) to fourth generation (4G LTE) cellular networks, in order to ensure adequate provision of voice call services, provision was made for a 3G Circuit Switched (CS) fallback in the case that LTE Voice over IP (VoIP) in the 4G LTE network was unavailable. With future 5G networks (so-called 5G System or 5GS networks) it is expected that in due course VoIP services will be fully available but that, during the transition from 4G LTE to 5G, a fallback from 5G to 4G Vol P will be required to ensure voice call service continuity. In practice the 4G networks will utilise an EPS and this fallback is therefore referred to as EPS fallback.

In a 5GS network, services, including voice call services, are enabled by the IP Multimedia Subsystem (IMS). Prior to a subscriber being able to access services, the subscriber (or rather the subscriber's User Equipment (UE)) must first register with the 5GS and then register with the IMS network. The network indicates to the UE at the time of 5GS registration, whether or not IMS voice is supported and whether or not EPS fallback is being used. In one scenario therefore, the 5GS is able to inform the UE that it does not support IMS voice calls but that, if the UE moves to EPS at the beginning of a call using the EPS fallback procedure, the call will be successfully established.

In the case of an originating call, prior to the UE sending a SIP INVITE to establish a call, the UE will send a service request to the 5GS which will move the UE to the EPS by means of a handover (HO) to the EPS or a redirection with target cell/frequency information (this target cell/frequency information notifies the UE towards which cell or which frequency it is directed to). FIG. 1 illustrates the signalling flow assuming that SIP preconditions are not used. FIG. 2 illustrates the signalling flow where SIP preconditions are used. [SIP preconditions is a mechanism defined in IETF RFC 4032 and used in the IMS specification 3GPP TS 24.229 to ensure that resources for an IMS session are established prior to ringing at the terminating UE starting.] In the case of a UE using a 3GPP access such as EPS, IMS triggers the EPS to setup conversational bearers in the EPS via the PCRF/PCF. Conversely, in the case of a terminating call, the UE sends the service request upon receipt of a SIP INVITE. The signalling flow associated with this scenario is shown in FIG. 3 for the case where no SIP preconditions are used. FIG. 4 illustrates the signalling flow where preconditions are involved. [If at the time of 5GS registration the UE is notified that the 5GS network supports neither voice calling nor EPS fallback then, at least for a "voice-centric" UE, e.g. a smartphone, the UE will be unable to camp on the 5GS.]

It is recognised here that problems may arise in the following scenarios:

When utilising EPS fallback in cases where precondition signalling is not used and early PCRF/PCF interaction with the IMS is used (this is an option in 3GPP TS 23.228) for terminating calls.

In order to speed up the call setup time when the EPS fallback procedure is used, certain processes may be carried out in parallel. This may cause race conditions that needs to be handled.

For the originating call case, when faster call setup is desired, the UE should delay sending the fallback request until it has received the "SIP 100 Trying". This may however give rise to a "race" condition between the fallback and the QoS establishment processes. This may in turn result in the resource reservation failing as the 5GS network does not support voice. The signalling flow associated with this scenario where the race condition cause call failure is shown in FIG. 5.

For the terminating call case, when faster call setup is required the UE should delay sending the fallback request until it is sure that the "SIP 100 Trying" has reached the IMS, i.e. by delaying the sending of the message for some predefined time. In this case there will be a race condition between the fallback and the QoS establishment processes. This may result in the resource reservation failing as the 5GS network does not support voice. The signalling flow showing the race conditions for a call using preconditions is shown in FIG. 6.

In the terminating call case, where the service request is sent by the UE in response to receipt of a SIP INVITE, it is possible that the IMS will ask for resources from the 5GS for the voice media either prior to, or in parallel with, the sending of the SIP INVITE to the UE. This may result in the resource reservation failing as the 5GS network does not support voice. FIG. 7 illustrates this scenario.

SUMMARY

According to a first aspect of the present invention there is provided a method of managing an Evolved Packet System (EPS) fallback procedure in a 5GS network. The method comprises making available to the Access Mobility Function (AMF), a configuration parameter per Public Land Mobile Network (PLMN) indicating if early or late PCRF/PCF interaction with the IMS is used. Then, upon receipt by the network of a 5GS network registration request from a UE, the home PLMN of the UE is identified as is the configuration parameter for that PLMN. The identified parameter is then used to determine for the UE whether or not EPS fallback is available to the UE, and an indication of the determination is sent to the UE.

The step of making available to the Access Mobility Function (AMF), a configuration parameter per Public Land Mobile Network (PLMN), may comprise storing at the AMF the identities of available PLMNs and their respective configuration parameters. Alternatively, said step of making available to the Access Mobility Function (AMF), a configuration parameter per Public Land Mobile Network (PLMN), may comprise providing an interface between the AMF and a Unified Data Management entity (UDM) to enable the AMF to perform a lookup using an identity of a PLMN associated with a registering UE to obtain a configuration parameter for that PLMN.

The step of sending an indication of the determination (i.e. whether or not EPS fallback is available to the UE) to the UE may comprise including the indication in a Registration Accept message sent by the network to the UE.

According to a second aspect of the present invention there is provided apparatus configured to operate as an Access Mobility Function (AMF) within a 5GS network. The apparatus comprises a processor or processors for maintaining or obtaining a configuration parameter per Public Land Mobile Network (PLMN) indicating if early or late PCRF/PCF interaction with the IMS is used. The processor or processors are further configured, upon receipt by the network of a 5GS network registration request from a UE, to identify the home PLMN of the UE and the configuration parameter for that PLMN and to use the configuration parameter to determine for the UE whether or not EPS fallback is available to the UE and send an indication of the determination to the UE.

According to a third aspect of the present invention there is provided method of managing an Evolved Packet System (EPS) fallback procedure in a 5GS network. The method comprises, at an Access Mobility Function (AMF) of the 5GS network, receiving a request for a PDU session establishment for a UE, determining that the request is associated with an IMS DNN and with EPS fallback and, in response to the determination, sending to an SMF-PGW-C an EPS fallback indication. The method further comprises, at said SMF-PGW-C, receiving said indication, subsequently receiving from a PCRF/PCF a request to establish a QoS flow, said indication causing the SMF-PGW-C not to proceed with the request to establish said QoS flow, and, upon completion of EPS fallback, continuing with a request to establish an EPS voice bearer.

According to a fourth aspect of the present invention there is provided apparatus configured to operate as an Access Mobility Function (AMF) of a 5GS network. The apparatus comprising a processor or processors for receiving a request for a PDU session establishment for a UE, determining that the request is associated with an IMS DNN and with EPS fallback and, in response to the determination, sending to an SMF-PGW-C an EPS fallback indication.

According to a fifth aspect of the present invention there is provided apparatus configured to operate as an SMF-PGW-C of a 5GS network, the apparatus comprising a processor or processors for receiving an EPS fallback indication from an Access Mobility Function (AMF) of the 5GS network. The processor or processors are further configured to subsequently receive from a PCRF/PCF a request to establish a QoS flow, said indication causing the SMF-PGW-C not to proceed with the request to establish said QoS flow. Upon completion of EPS fallback, to processor or processors are configured to continue with a request to establish an EPS voice bearer.

DETAILED DESCRIPTION

Figure 8:
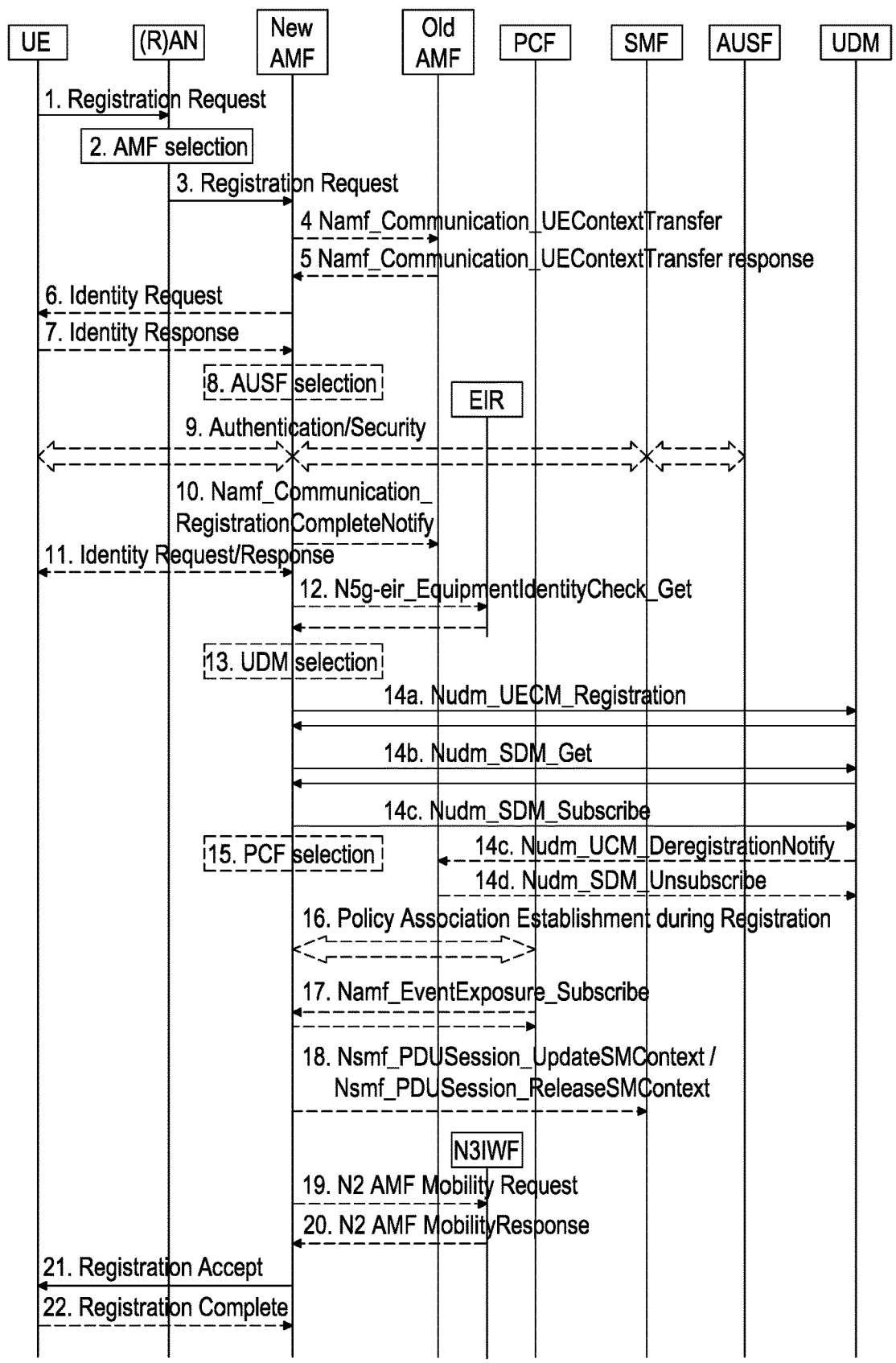
FIG. 8 is a prior art signalling flow associated with UE registration in a 5GS network.

According to the proposed 5GS architecture, UE registration with the 5GS network following the flow illustrated in FIG. 8 (3GPP TS 23.502, 4.2.2.2.2-1). Within this flow the network may indicate to a registering UE that EPS fallback is available. It indicates this at step 21, Registration Accept.

As has been discussed above, problems may arise when utilising EPS fallback in cases where early PCRF/PCF interaction with the IMS is required. In order to avoid or mitigate these problems, according to at least certain embodiments, it is proposed here to take into account whether or not such early or late PCRF/PCF interaction with the IMS is used, when indicating to registering UEs whether or not EPS fallback is available. In other words, this indication will indicate to a UE not just that EPS fallback is available but rather whether that fallback will work in practice.

A solution making use of this approach involves making available in the Access Mobility Function (AMF), a configuration parameter per Public Land Mobile Network (PLMN) indicating if early or late PCRF/PCF interaction with the IMS is used, i.e if EPS fallback will work. The configuration parameter would be set (per PLMN) to: (a) EPS fallback supported or (b) EPS fallback not supported. Whilst the parameter may be stored in the AMF, in a modified approach, the Unified Data Management entity (UDM) stores the parameter and, at a UE initial registration to a PLMN, the parameter is sent from the UDM to the AMF, and thus the parameter is part of the UE context in the AMF.

The AMF will use the parameter as one input when determining the EPS fallback available indication to be provided to a registering UE. If the new configuration parameter is not available to the AMF, e.g. because one is not provided to it by the UDM, then the AMF may make a default assumption that early PCRF/PCF interaction with the IMS is used and therefore indicate to the UE that EPS fallback is not available. In line with existing procedures, a voice-centric UE receiving an indication that EPS fallback is not available may decide not to camp on the 5GS network.

With reference to the 5GS network registration flow shown in FIG. 8, a parameter indicating the PCRF/PCF method (early or late interaction) is sent by the UDM to the (new) AMF in step 14*b* (Nudm_SDM_Get operation), and the AMF takes the fallback decision (EMS fallback available or unavailable) before step 21 (Registration Accept) in which the decision is sent to the UE.

Figure 9:
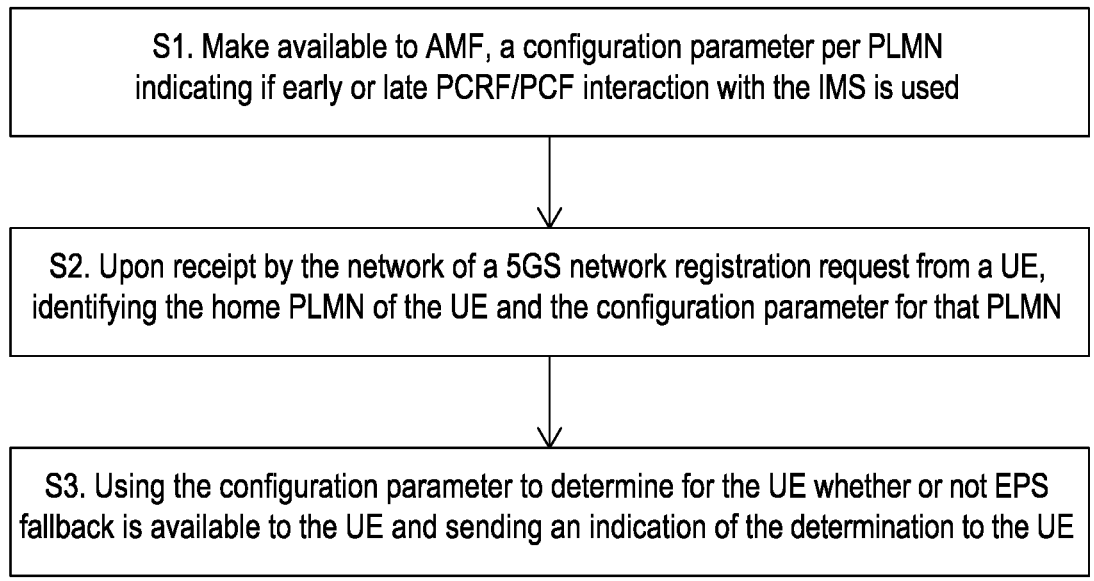
FIG. 9 is a flow diagram illustrating a method according to a first embodiment of notifying a UE at 5GS network registration of EPS fallback availability.

FIG. 9 illustrates at a high level the method described above. At step S1, a configuration parameter per PLMN is made available to the AMF. This parameter indicates if early or late PCRF/PCF interaction with the IMS is used. At step S2, upon receipt by the network of a 5GS network registration request from a UE, the AMF identifies the home PLMN of the UE and the configuration parameter for that PLMN. At step S3, the AMF uses the configuration parameter to determine, for the UE, whether or not EPS fallback is available to the UE. It then sends an indication of the determination to the UE.

Figure 10:
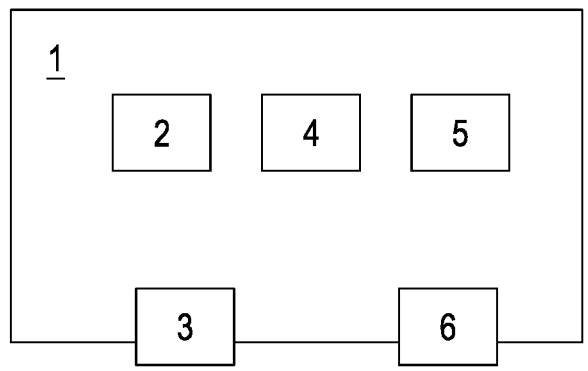
FIG. 10 illustrates schematically an AMF for use in the method of FIG. 9.

FIG. 10 illustrates schematically apparatus 1 configured to operate as an Access Mobility Function (AMF) within a 5GS network. The apparatus comprises computer hardware and software in the form of processors, memories, program code, data, etc, configured to provide the following.

A unit 2 for maintaining or obtaining a configuration parameter per Public Land Mobile Network (PLMN) indicating if early or late PCRF/PCF interaction with the IMS is used.

A receiver 3 for receiving a 5GS network registration request from a UE.

A unit 4 for identifying the home PLMN of the UE and the configuration parameter for that PLMN.

A unit 5 for using the configuration parameter to determine for the UE whether or not EPS fallback is available to the UE.

A transmitter 6 for sending an indication of the determination to the UE.

According to an alternative solution which both solves the early PCRF/PCF for terminating calls and provides faster call setup times, the Session Management Function (SMF) may act at QoS flow setup for a voice call to effectively cancel the setting up of the flow, pending EPS fallback. Thus a failure of the QoS flow setup due to unavailable resources is avoided. To do this the AMF is configured with the identity of the Access Point Name/Data Network Name (APN/DNN) that is used for voice calls. At Packet Data Unit (PDU) session establishment to the IMS APN/DNN, the AMF sends to the SMF-PGW-C (see TS 23.501 for the i/w architecture) an EPS fallback indication if EPS fallback will be used as part of the PDU session establishment procedure (the AMF could always send this indication with possible values supported/not supported). If the SMF has received the indication that EPS fallback is being used, then when it receives the request from the PCC to establish a voice QoS flow, it will not proceed with the request, but will rather wait for the EPS fallback to happen. When fallback is complete (the IMS PDU Session on 5GS has been transferred to an IMS PDN connection on the EPS), the SMF+PGW will continue with the request to establish an EPS voice bearer.

Figure 1:
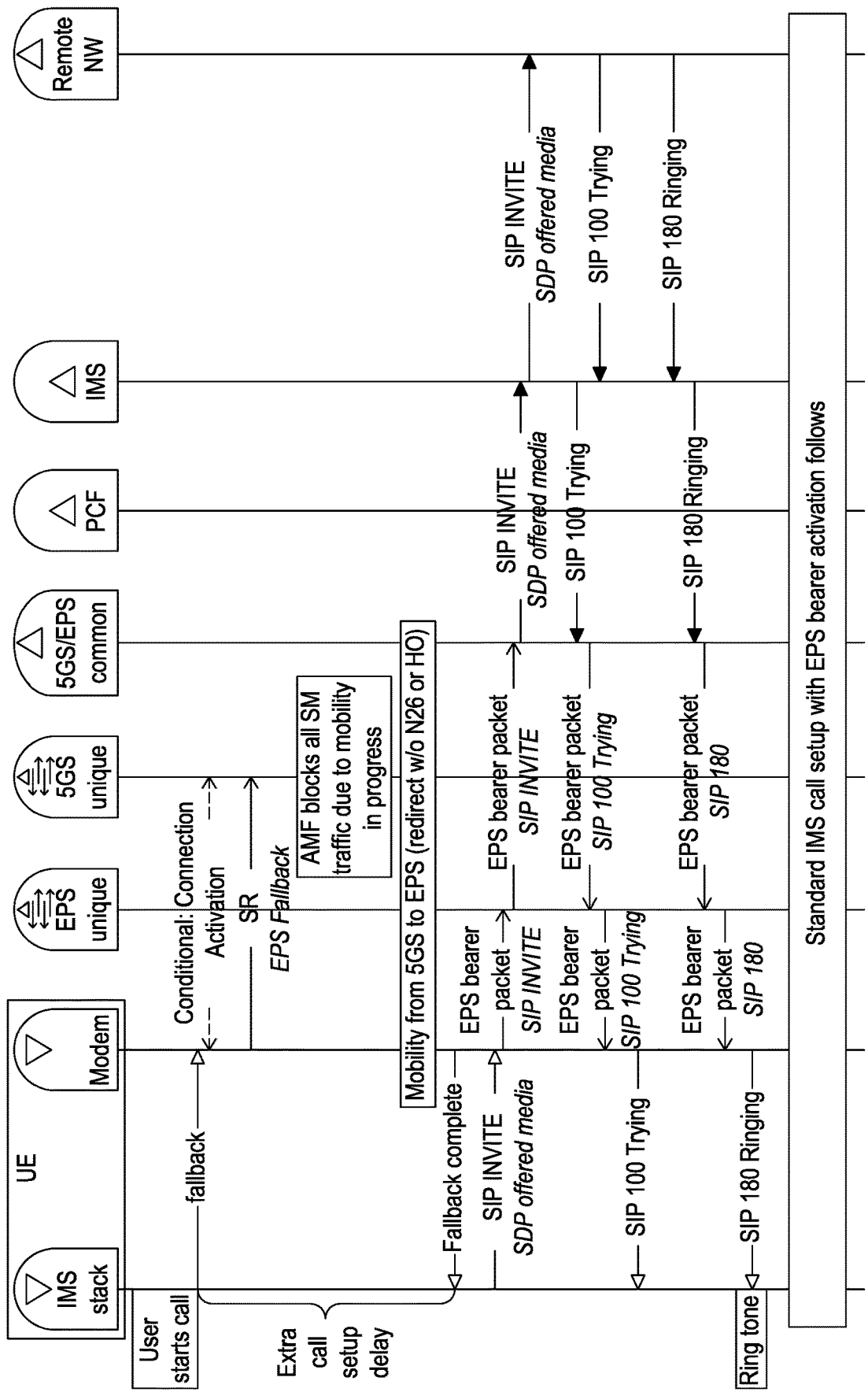
FIG. 1 is a prior art signaling flow associated with an originating side call with EPS fallback, without preconditions.
Figure 2:
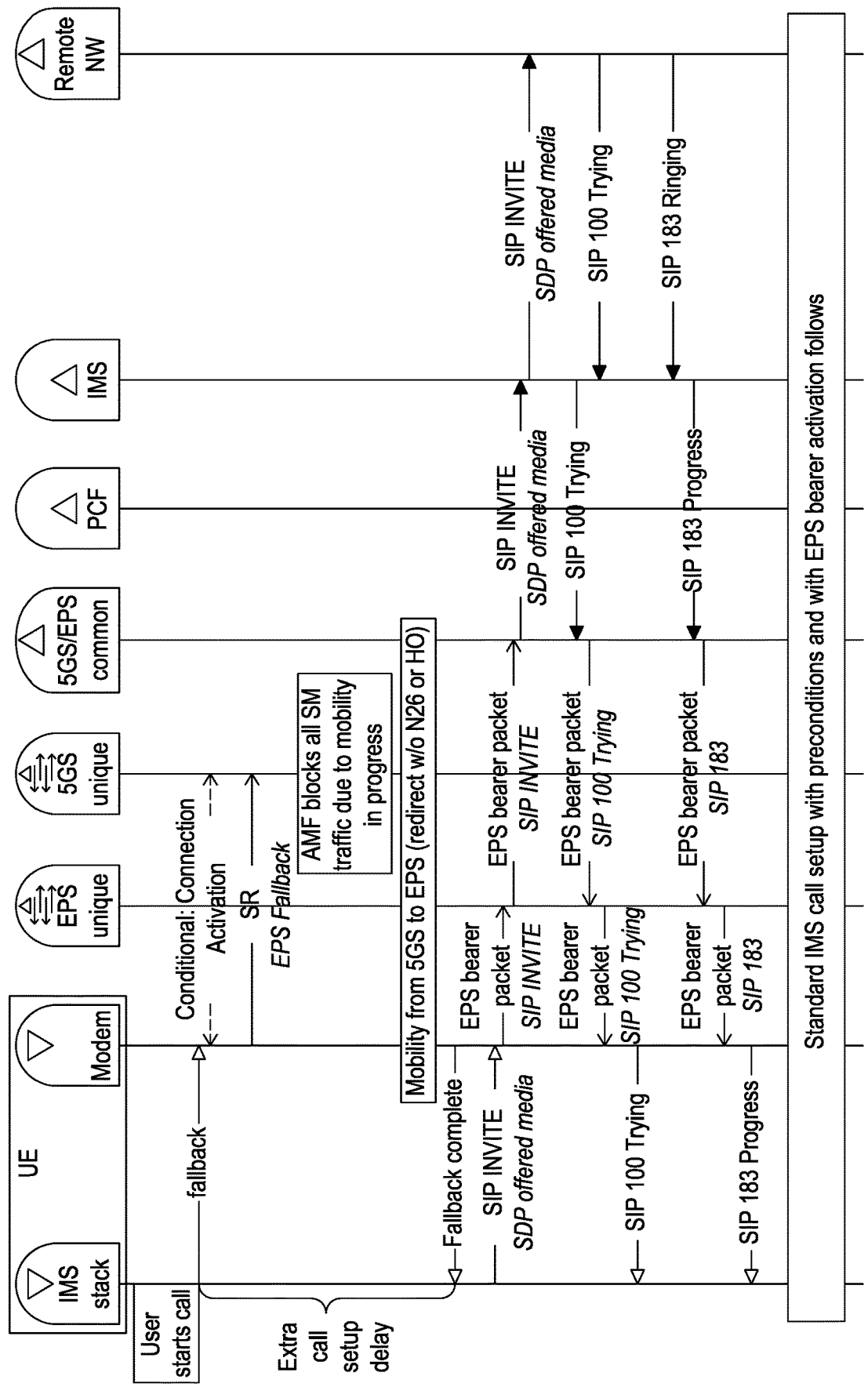
FIG. 2 is a prior art signaling flow associated with an originating side call with EPS fallback, with preconditions.
Figure 3:
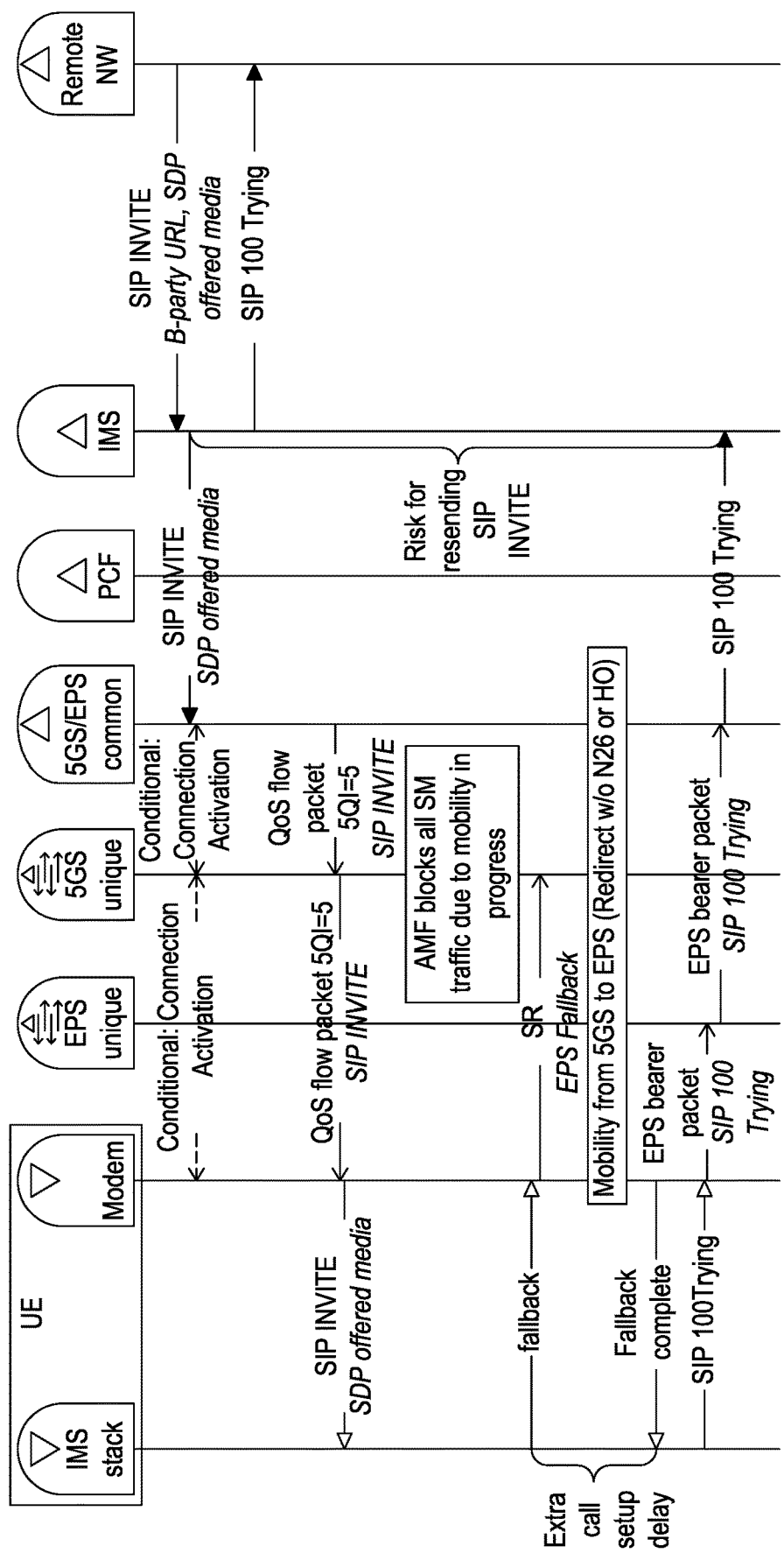
FIG. 3 is a prior art signaling flow associated with a terminating side call with EPS fallback, without preconditions.
Figure 3:
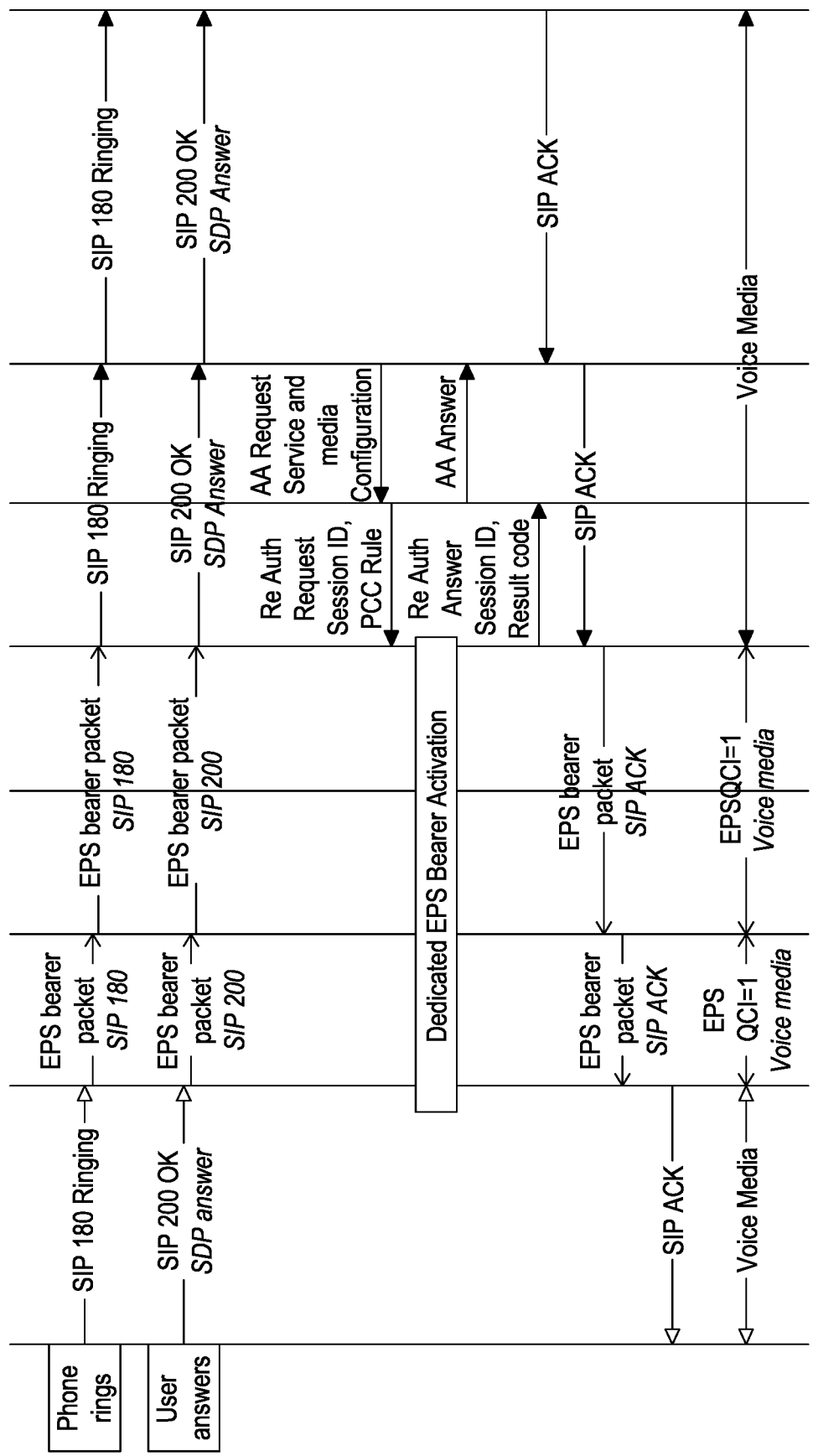
Figure 4:
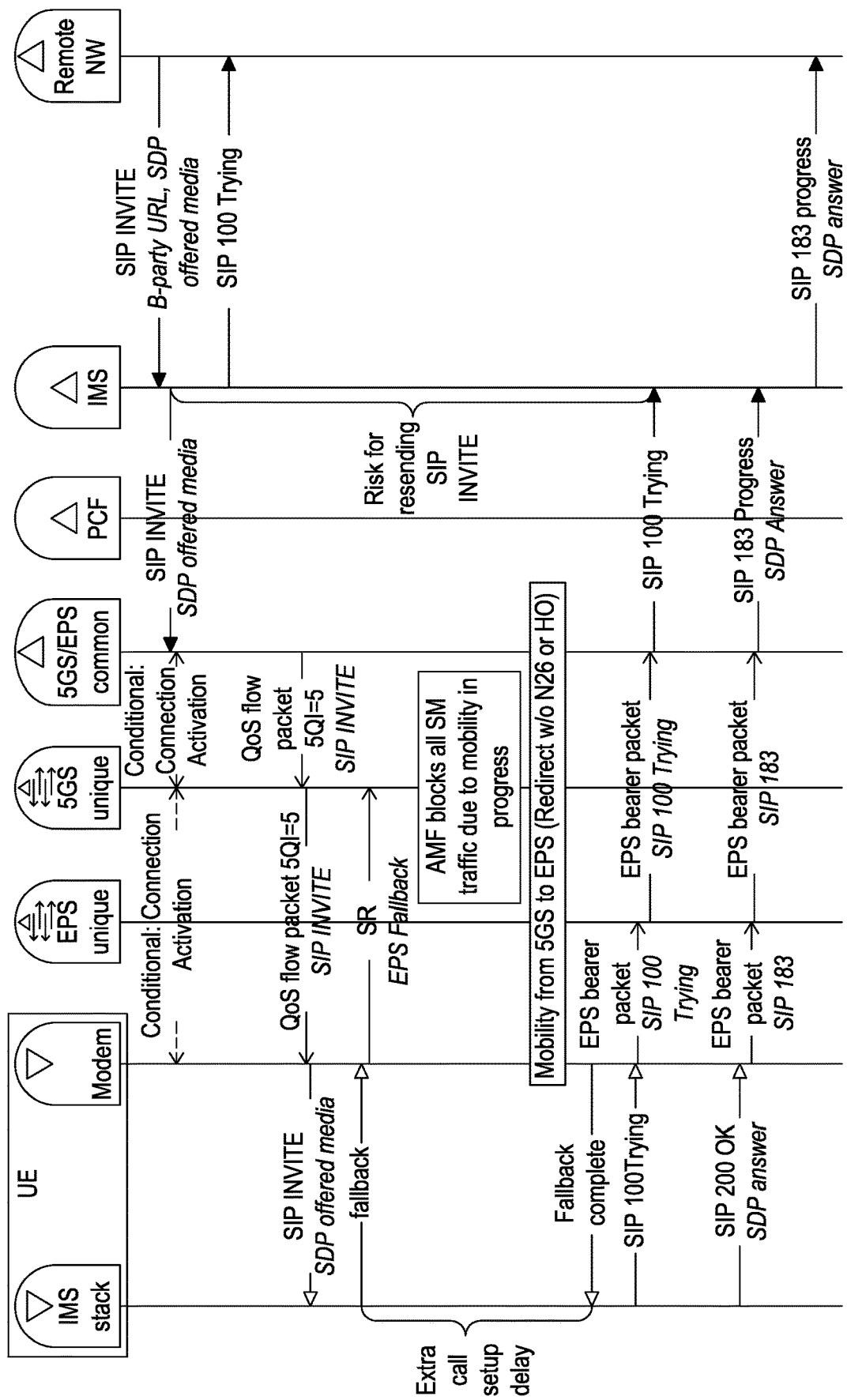
FIG. 4 is a prior art signaling flow associated with an originating side call with EPS fallback, with preconditions.
Figure 4:
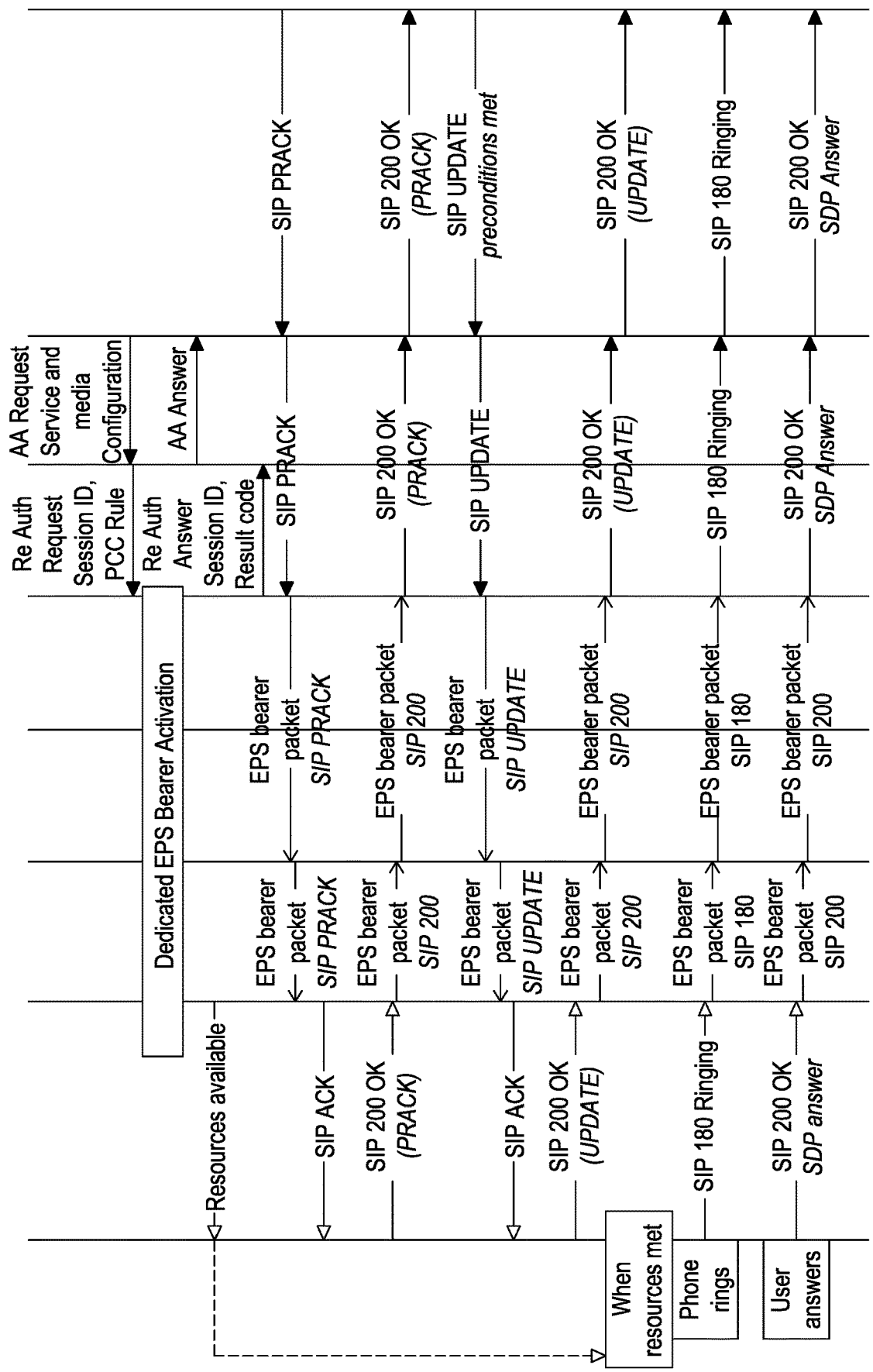
Figure 4:
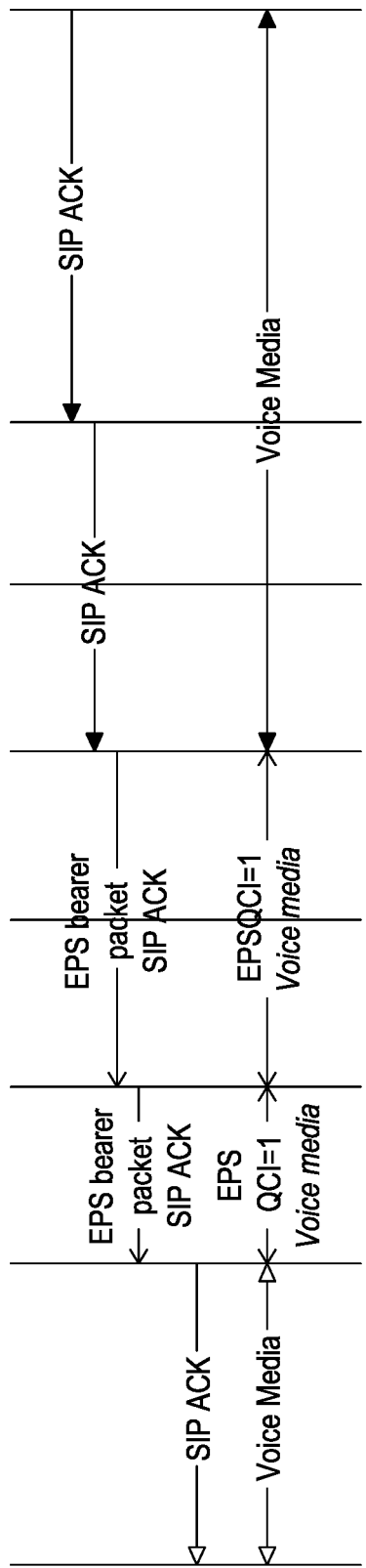
Figure 5:
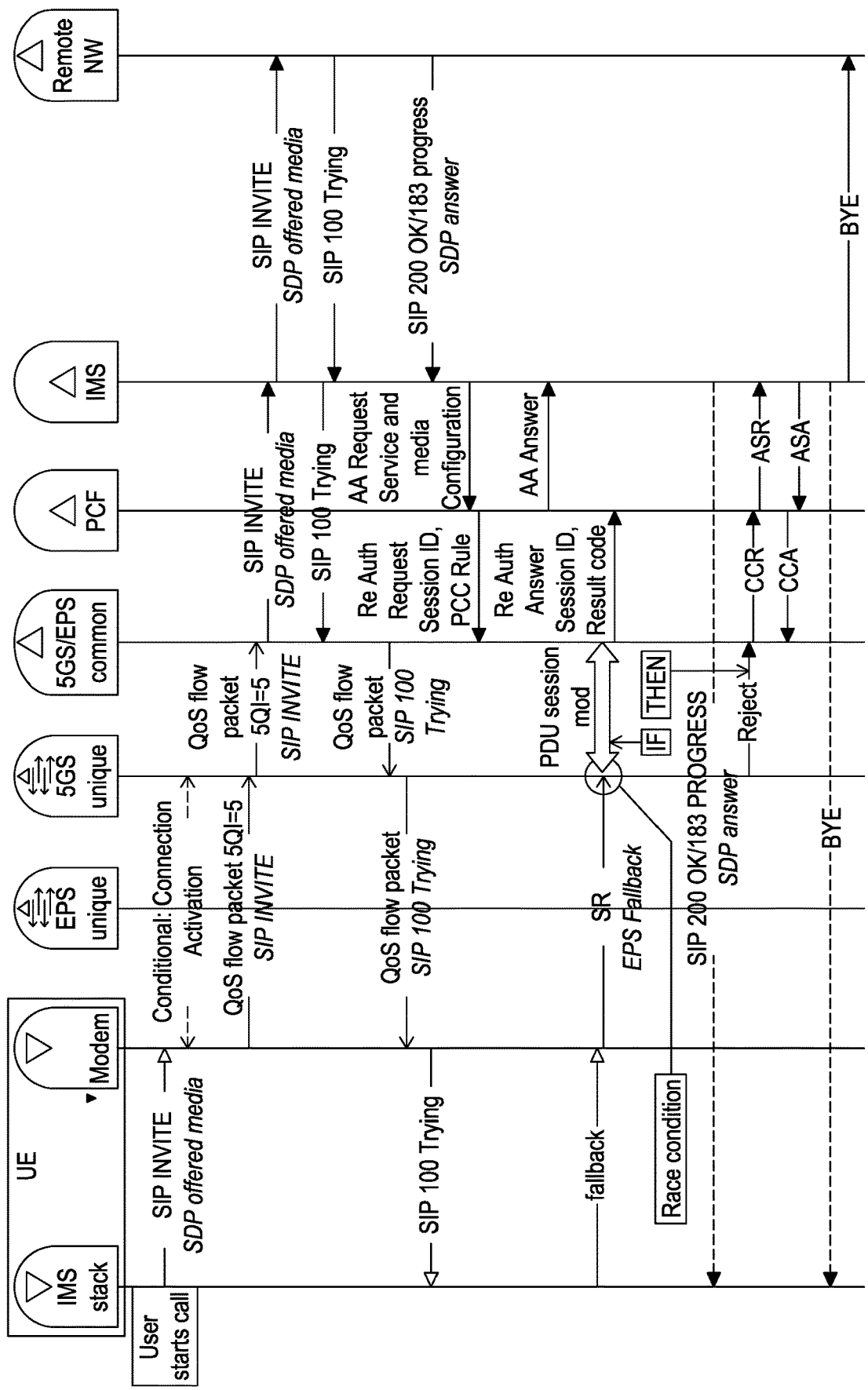
FIG. 5 is a prior art signaling flow associated with an originating call case, where the UE delays sending the fallback request until it has received the "SIP 100 Trying", giving rise to a "race" condition between the fallback and the QoS establishment processes.
Figure 6:
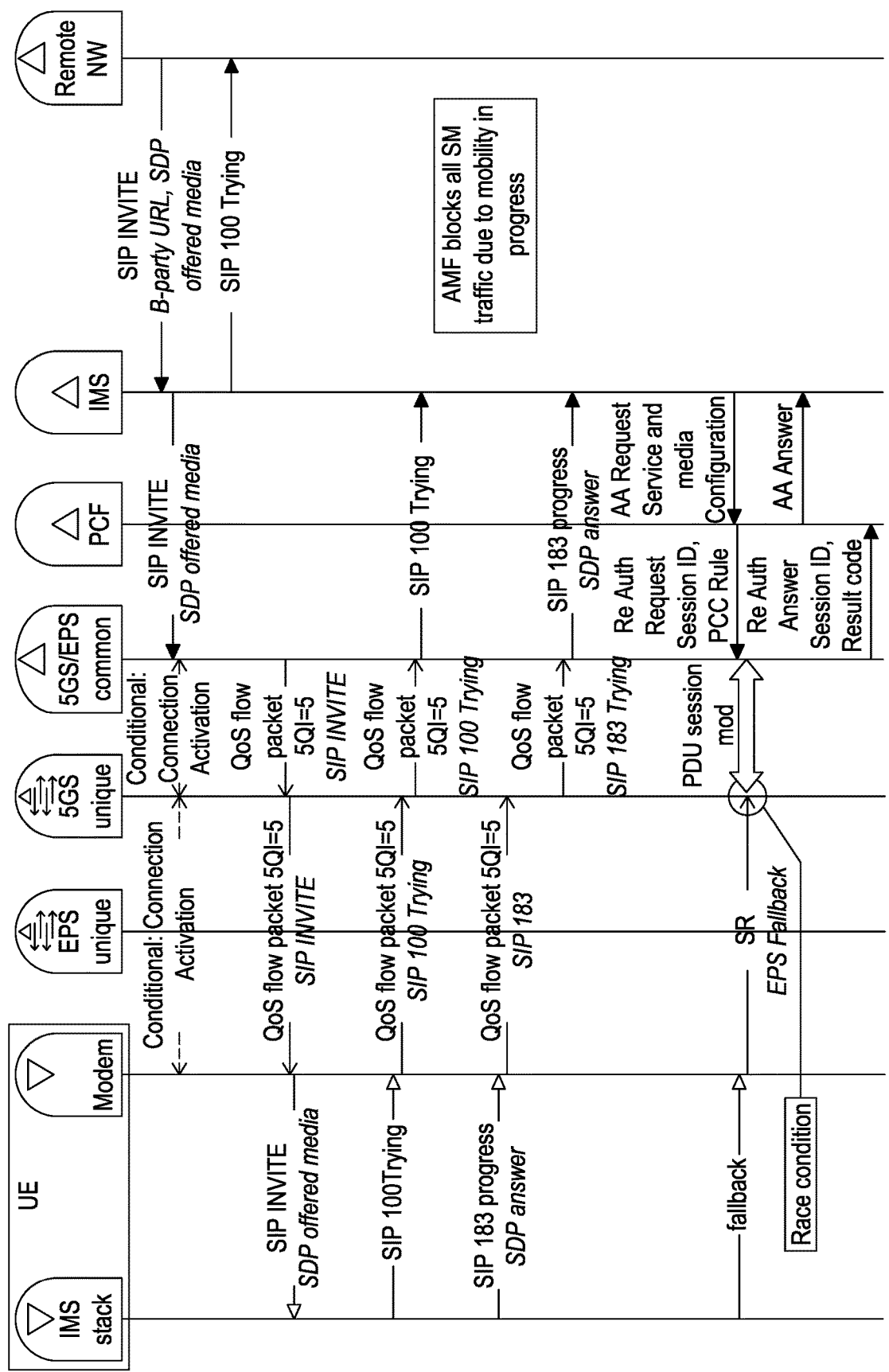
FIG. 6 is a prior art signaling flow associated with a terminating call case, where the UE delays sending the fallback request until it is sure that the "SIP 100 Trying" has reached the IMS, giving rise to a race condition between the fallback and the QoS establishment processes.
Figure 6:
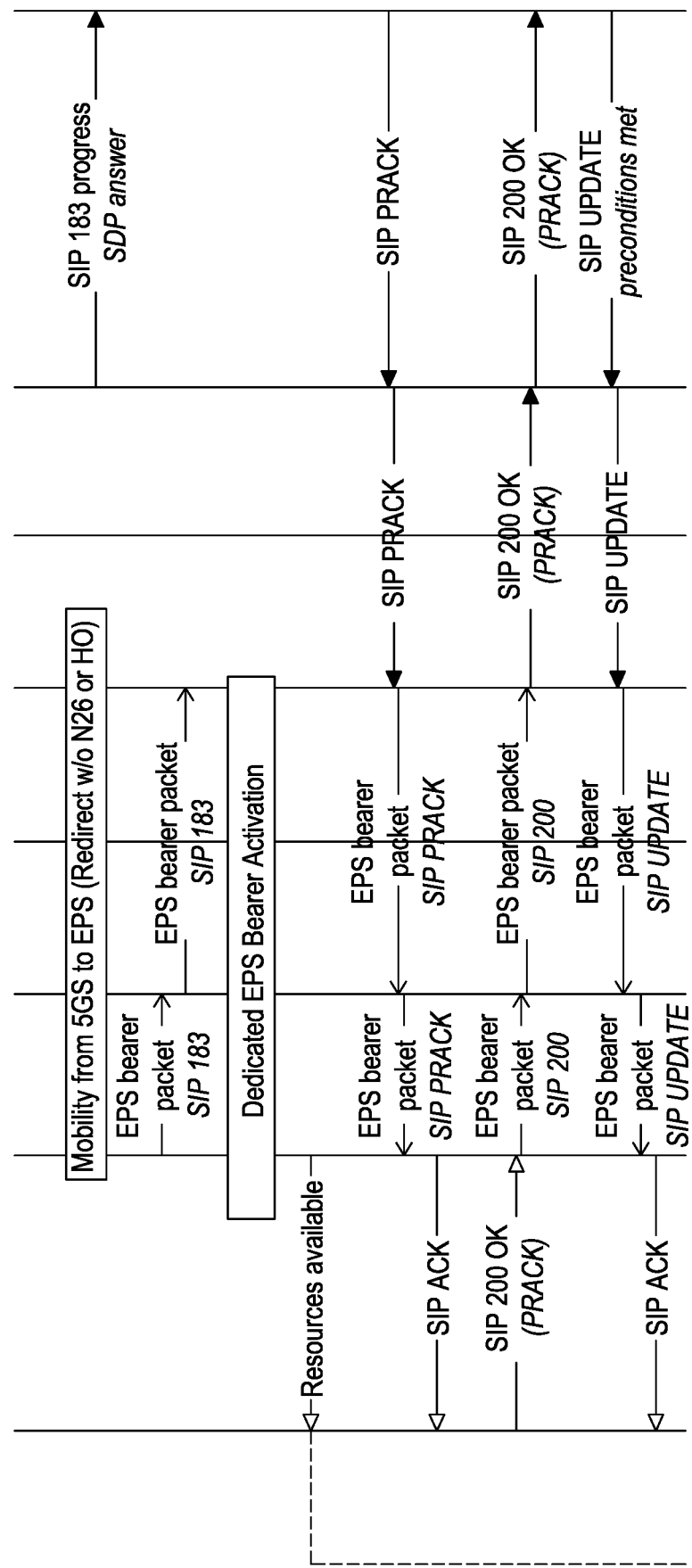
Figure 6:
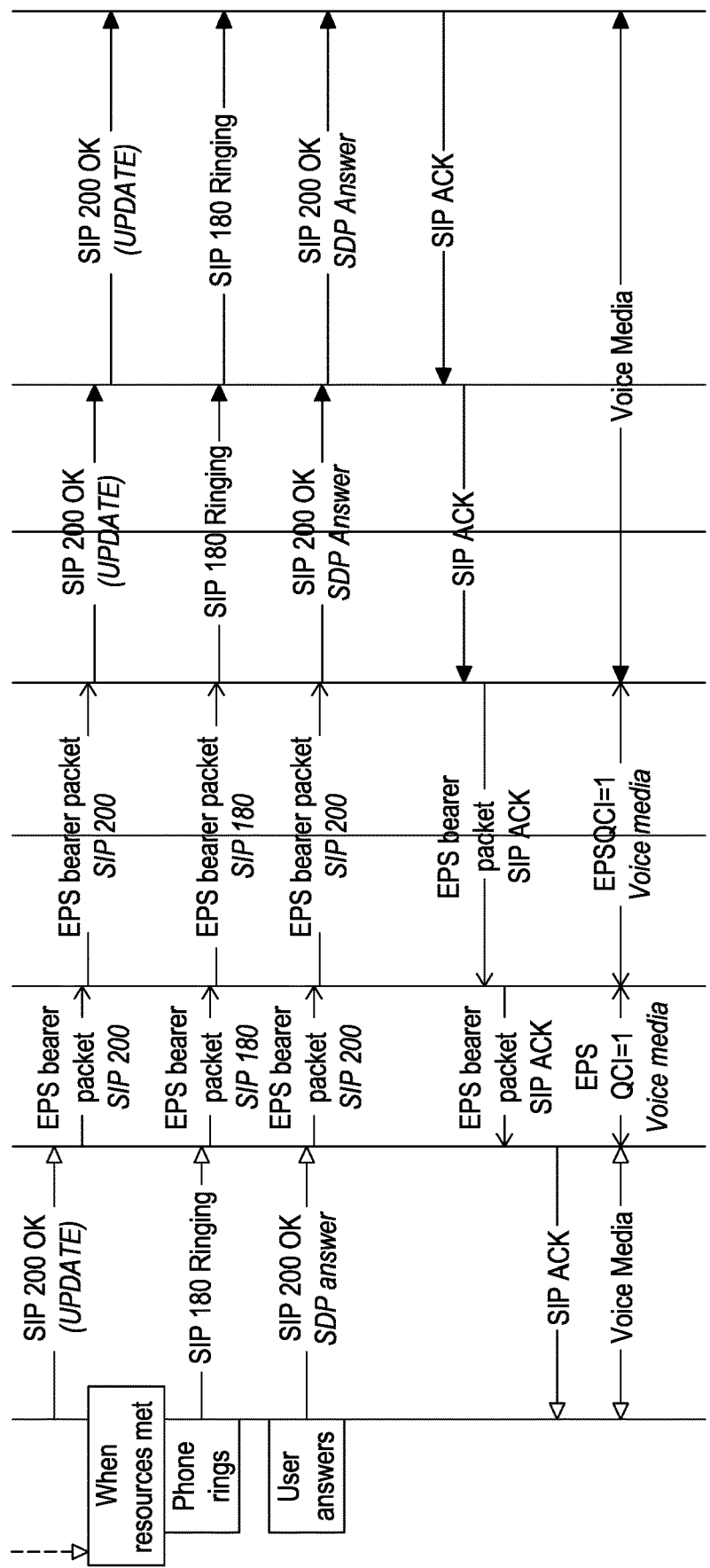
Figure 7:
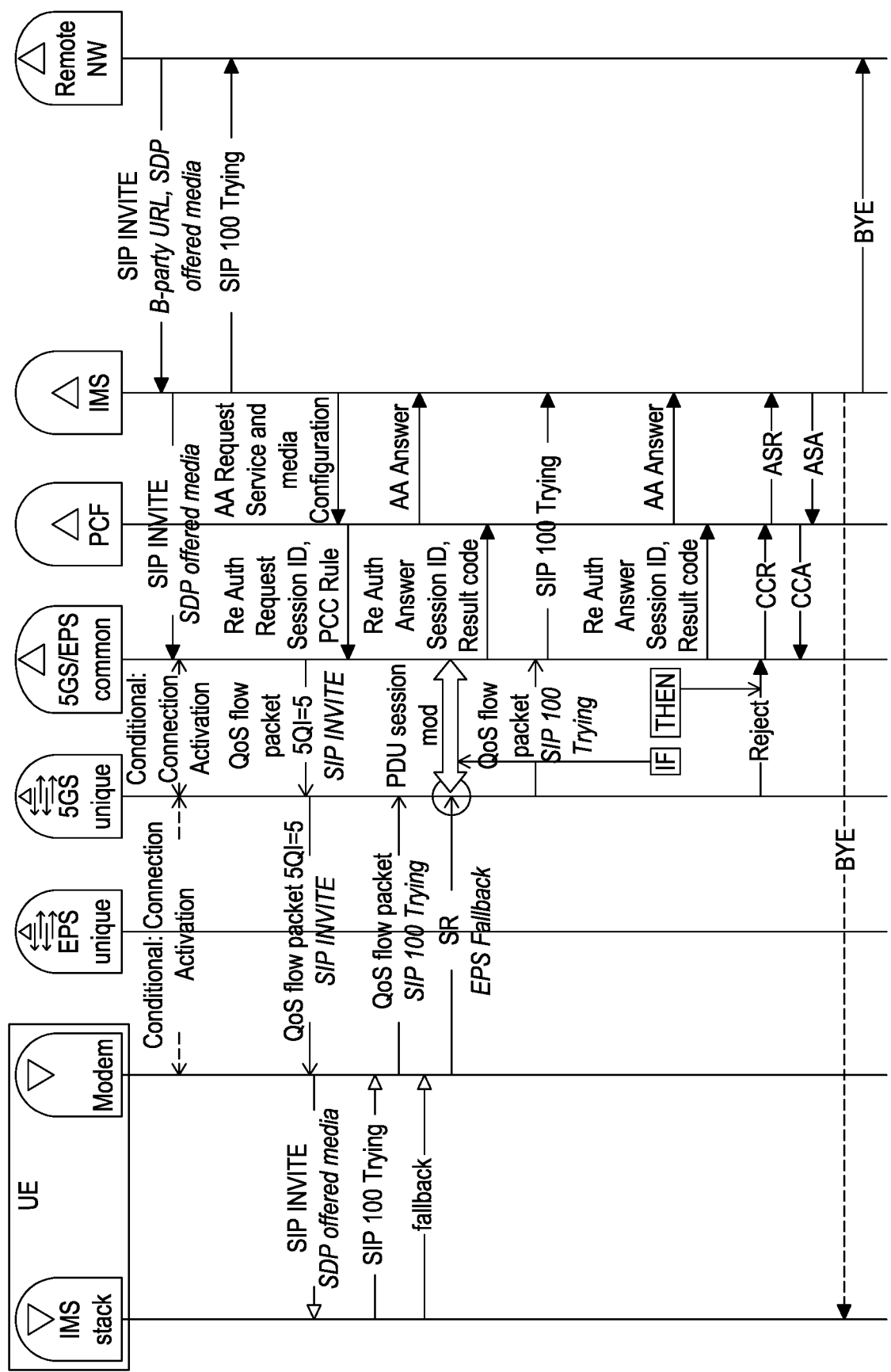
FIG. 7 is a prior art signaling flow illustrating a terminating call case without preconditions and in which resource reservation failing in the case that the 5GS network does not support voice.
Figure 11:
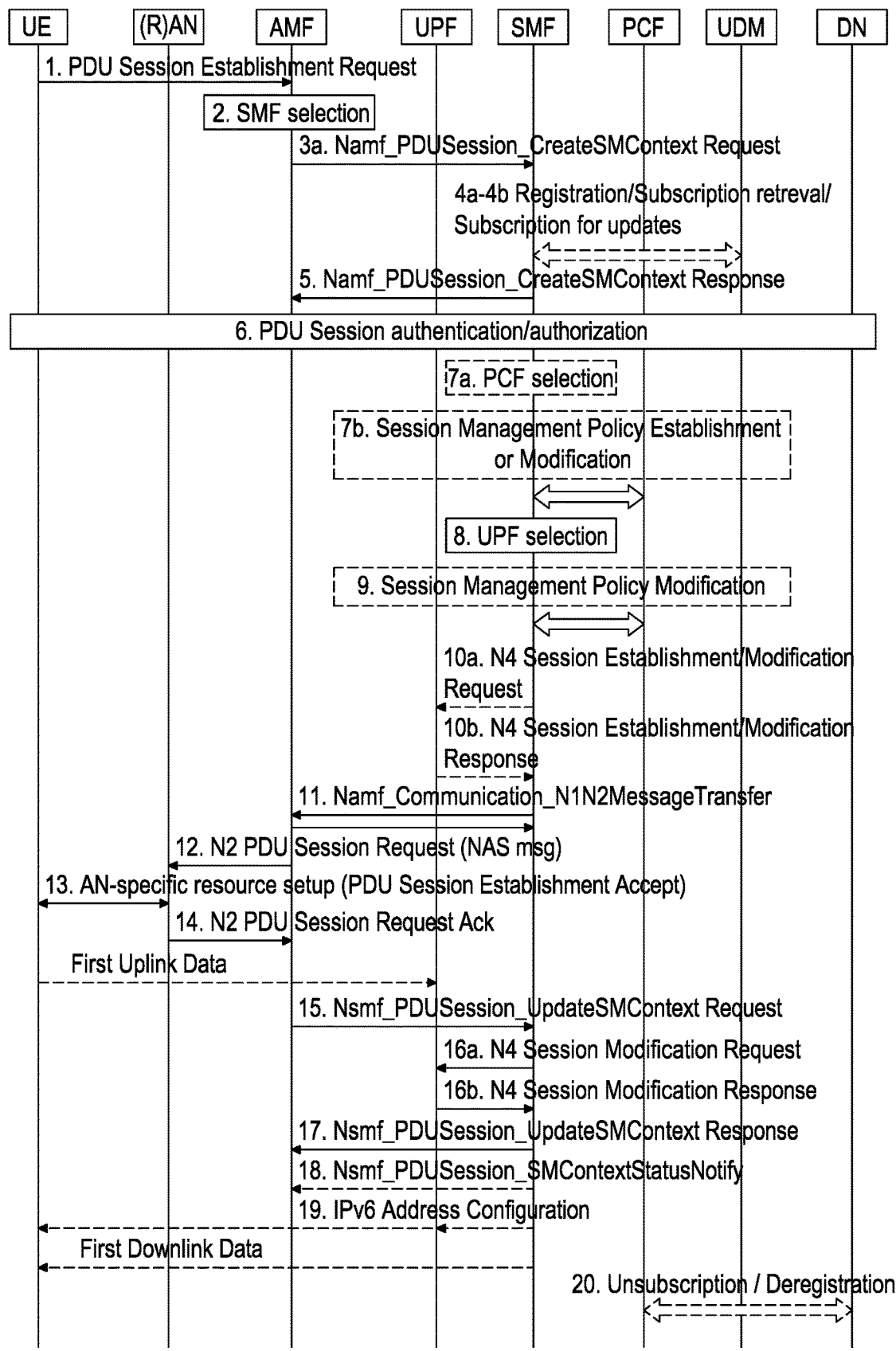
FIG. 11 is a signalling flow associated with a second embodiment in which, at PDU session establishment, the AMF indicates to the SMF if fallback is used and the SMF PGW-C does not start the PDU session modification procedure until mobility to EPS is completed.

FIG. 11 shows the PDU session establishment procedure (FIG. 4.3.2.2.1-1 in 3GPP TS 23.502) where, at step 3*a*, in accordance with this proposal, the AMF indicates to the SMF if fallback is used. To mitigate the race condition/problem identified in FIGS. 5 to 7 and as described above, the SMF PGW-C will not start the PDU session modification procedure (to establish a QoS Flow) but will rather wait for the mobility to EPS to happen.

Figure 12:
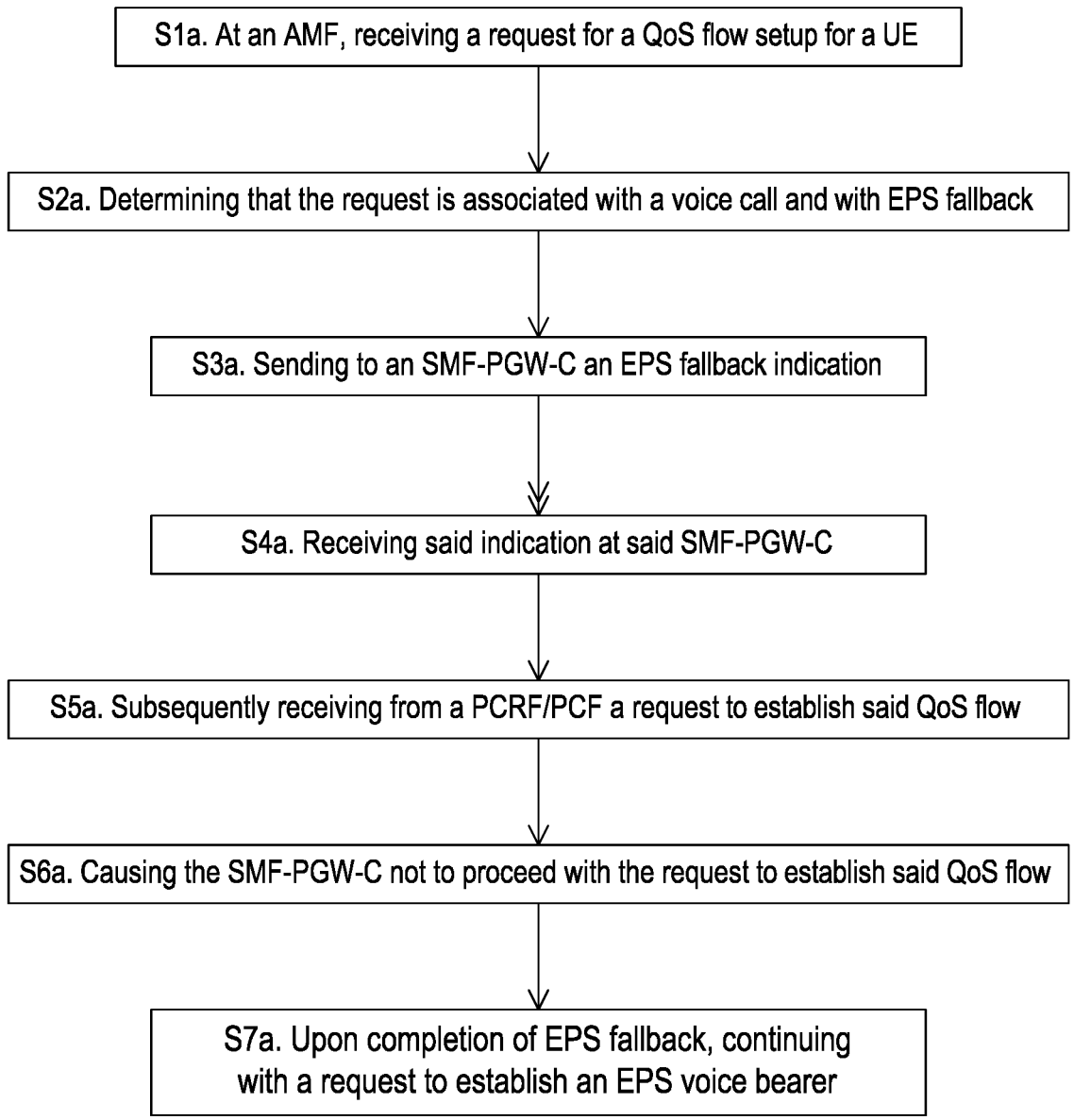
FIG. 12 is a flow diagram further illustrating the method of FIG. 11.

FIG. 12 is a flow diagram further illustrating this alternative solution involving the following steps:

S1*a*. At an AMF, receiving a request for a QoS flow setup for a UE

S2*a*. Determining that the request is associated with a voice call and with EPS fallback S3*a*. Sending to an SMF-PGW-C an EPS fallback indication S4*a*. Receiving said indication at said SMF-PGW-C S5*a*. Subsequently receiving from a PCRF/PCF a request to establish said QoS flow S6*a*. Causing the SMF-PGW-C not to proceed with the request to establish said QoS flow S7*a*. Upon completion of EPS fallback, continuing with a request to establish an EPS voice bearer.

Figure 13:
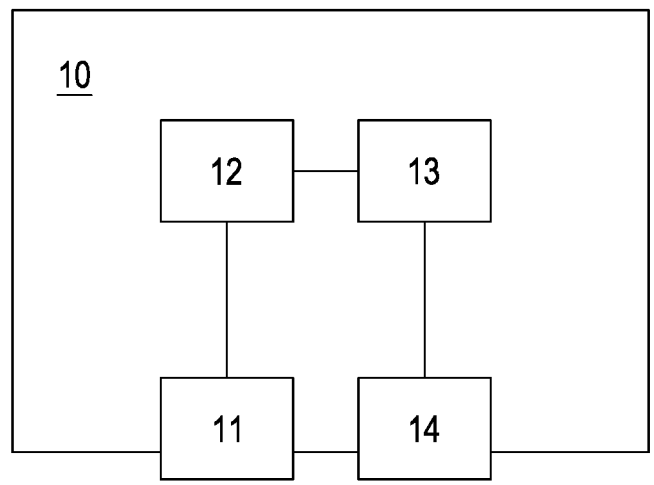
FIG. 13 illustrates schematically apparatus providing an AMF configured for use in the method of FIGS. 11 and 12.
Figure 14:
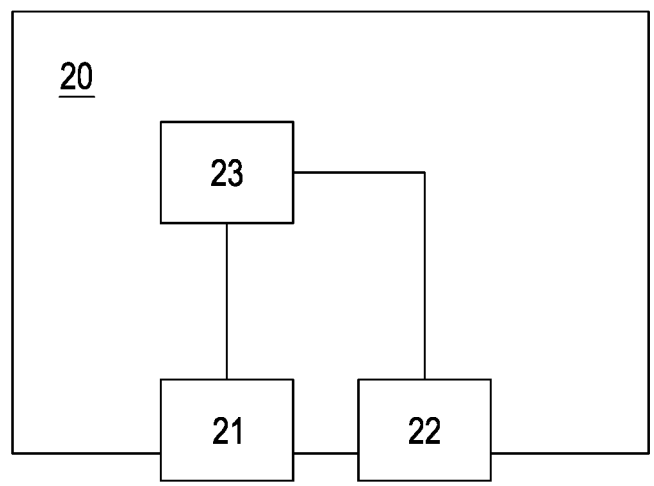
FIG. 14 illustrates apparatus 20 configured to operate as an SMF-PGW-C for use in the method of FIGS. 11 and 12.

FIG. 13 illustrates schematically apparatus 10 configured to operate as an AMF within the scope of this alternative solution. The apparatus comprises an input 11 for receiving a request for a QoS flow setup for a UE. It further comprises a unit 12 for determining that the request is associated with a voice call and with EPS fallback. A further unit 13 is coupled to receive this determination from the unit 12 and, in response, to send to an SMF-PGW-C, via an output 14, an EPS fallback indication FIG. 14 illustrates schematically apparatus 20 configured to operate as an SMF-PGW-C within the scope of this alternative solution. The apparatus comprises a receiver 21 for receiving an EPS fallback indication from an Access Mobility Function (AMF) of the 5GS network such as that illustrated in FIG. 13. The apparatus comprises a further input 22 for subsequently receiving from a PCRF/PCF a request to establish said QoS flow. A unit 23 receives both of said indications and, in response, causes the SMF-PGW-C not to proceed with the request to establish said QoS flow. Upon completion of EPS fallback, unit 23 continues with a request to establish an EPS voice bearer.

It will be appreciated by the person of skill in the art that various modifications may be made to the above described embodiments without departing from the scope of the present invention.

The invention claimed is:

1. A method of managing an Evolved Packet System (EPS) fallback procedure in a 5GS network, the method comprising:
    making available to an Access Mobility Function (AMF) a configuration parameter per Public Land Mobile Network (PLMN) indicating if early or late PCRF/PCF interaction with an IMS is used;
    after receiving a 5GS network registration request from a user equipment (UE), identifying the home PLMN of the UE and the configuration parameter for that PLMN;
    using the configuration parameter to determine for the UE whether or not EPS fallback is available to the UE; and
    sending an indication of the determination to the UE.

2. The method of claim 1, wherein said step of making available to the AMF the configuration parameter comprises storing at the AMF the identities of available PLMNs and their respective configuration parameters.

3. The method of claim 1, wherein said step of making available to the AMF the configuration parameter comprises providing an interface between the AMF and a Unified Data Management entity (UDM) to enable the AMF to perform a lookup using an identity of a PLMN associated with a registering UE to obtain a configuration parameter for that PLMN.

4. The method of claim 1, wherein said step of sending the indication to the UE comprises sending to the UE a registration accept message comprising the indication.

5. An apparatus configured to operate as an Access Mobility Function (AMF) within a 5GS network, the apparatus comprising a processor or processors for:
  maintaining or obtaining a configuration parameter per Public Land Mobile Network (PLMN) indicating if early or late PCRF/PCF interaction is used;
  after receipt a 5GS network registration request from a UE, identifying the home PLMN of the UE and the configuration parameter for that PLMN;
  using the configuration parameter to determine for the UE whether or not EPS fallback is available to the UE; and
  sending an indication of the determination to the UE.

* * * * *